US012405577B2

(12) United States Patent
Benoist et al.

(10) Patent No.: US 12,405,577 B2
(45) **Date of Patent: *Sep. 2, 2025**

(54) SOUND-GENERATING TIMEPIECE

(71) Applicant: PATEK PHILIPPE SA GENÈVE, Geneva (CH)

(72) Inventors: Quentin Benoist, Grand-Lancy (CH); Sylvain Geiser, St-Cergue (CH); Eric Le Gall, Nyon (CH); Alessandro Vandini, Tannay (CH)

(73) Assignee: PATEK PHILIPPE SA GENÈVE, Geneva (CH)

( * ) Notice: Subject to any disclaimer, the term of this patent is extended or adjusted under 35 U.S.C. 154(b) by 523 days.

This patent is subject to a terminal disclaimer.

(21) Appl. No.: 17/771,740

(22) PCT Filed: Oct. 23, 2020

(86) PCT No.: PCT/EP2020/079955
§ 371 (c)(1),
(2) Date: Apr. 25, 2022

(87) PCT Pub. No.: WO2021/078972
PCT Pub. Date: Apr. 29, 2021

(65) Prior Publication Data
US 2022/0382218 A1 Dec. 1, 2022

(30) Foreign Application Priority Data
Oct. 25, 2019 (EP) .................................... 19205441

(51) Int. Cl.
*G04B 23/12* (2006.01)
*G04B 21/08* (2006.01)
(Continued)

(52) U.S. Cl.
CPC ............ *G04B 23/12* (2013.01); *G04B 21/08* (2013.01); *G04B 23/028* (2013.01); *G04B 37/0075* (2013.01)

(58) Field of Classification Search
None
See application file for complete search history.

(56) References Cited

U.S. PATENT DOCUMENTS 148,636 A * 3/1874 Wenzel .................. G04B 9/025 368/243

FOREIGN PATENT DOCUMENTS

| | | |
|---|---|---|
| CH | 4918 | 9/1892 |
| CH | 294406 | 11/1953 |
| FR | 990.766 | 9/1951 |

OTHER PUBLICATIONS

Translation of FR990766, Espacenet (Year: 1949).*
(Continued)

*Primary Examiner* — Renee S Luebke
*Assistant Examiner* — Matthew Daniel Hwang
(74) *Attorney, Agent, or Firm* — NIXON & VANDERHYE

(57) ABSTRACT

Disclosed is a mechanical wristwatch including a case having a middle, a back cover and a bezel, a vibration-generating device for generating vibrations which are intended to produce at least one sound, which is accommodated in the case, a vibration-amplifying for amplifying the vibrations generated by the vibration-generating device, and a membrane arranged to receive the amplified vibrations and generate a sound from the inside to the outside of the wristwatch. The vibration-generating device is a rotary element having a reading surface including at least one groove arranged to generate sounds. The wristwatch also includes a unit for rotationally driving the rotary element, an actuator for such unit, and a transmission member arranged
(Continued)

to cooperate with the rotary element to transmit, to the vibration-amplifying device, the vibrations generated by the groove during rotational movement of the rotary element.

24 Claims, 6 Drawing Sheets

(51) Int. Cl.
*G04B 23/02* (2006.01)
*G04B 37/00* (2006.01)

(56) References Cited

OTHER PUBLICATIONS

International Search Report for PCT/EP2020/079955, dated Jan. 26, 2021, 3 pages.
Written Opinion of the ISA for PCT/EP2020/079955, dated Jan. 26, 2021, 9 pages.

* cited by examiner

SOUND-GENERATING TIMEPIECE

This application is the U.S. national phase of International Application No. PCT/EP2020/079955 filed Oct. 23, 2020 which designated the U.S. and claims priority to EP 19205441.9 filed Oct. 25, 2019, the entire contents of each of which are hereby incorporated by reference.

BACKGROUND OF THE INVENTION

Field of the Invention

The present invention relates to a mechanical timepiece, and more specifically a mechanical wristwatch, comprising a case having a middle, a back cover and a bezel, a device for generating vibrations which are intended to produce at least one sound, which is accommodated in said case, a device for amplifying the vibrations generated by said vibration-generating device, and a membrane arranged to receive said amplified vibrations and generate a sound from the inside to the outside of the timepiece, and more specifically of the wristwatch.

In the present description, the expression "mechanical timepiece or wristwatch" means that the timepiece or wristwatch comprises only mechanical elements for performing its different functions, and more particularly that the sound and the amplification thereof are produced solely using mechanical elements.

Description of the Related Art

Such a timepiece is for example a wristwatch with a striking-mechanism (such as a minute-repeater, grande sonnerie, petite sonnerie, alarm) for which the vibration-generating device is a gong arranged to be struck by a hammer when the striking-mechanism is engaged to generate vibrations in order produce a sound. A watch with a striking-mechanism generally comprises two gongs, one to produce a deep sound and the other to produce a high-pitched sound. Even with modifications made to the two gongs and to the alternation with which they strike the hours differently from the quarter-hours or minutes, the watch with a striking-mechanism is limited to only two different sounds corresponding to each of the two gongs.

Furthermore, a pocket watch is known allowing the time to be spoken, as described in patent CH 4918. The pocket watch comprises a stylus and a disc comprising 48 concentric grooves. The stylus is controlled to be positioned above the groove to which it is assigned, corresponding to the time to be spoken. The disc is raised to come into contact with the stylus and begins to rotate so that the stylus reads, on the groove, the time to be spoken. The produced sound is thus very short, a few seconds, just enough time for the time to be spoken.

SUMMARY OF THE INVENTION

According to a first aspect, the present invention aims to overcome these disadvantages by proposing a wristwatch which enables the generation of a combination of more than two different sounds, enabling for example music or words to be reproduced within the limited space of a wristwatch.

According to another aspect, the present invention aims to propose a timepiece enabling the generation of sounds during a period of time sufficiently long to allow a piece of music or a speech, for example, to be reproduced.

A further object of the present invention is to enable amplification of the generated sounds to a significant degree, and preferably with limitation, or even cancellation, of unwanted noise.

To this end, the present invention relates to a mechanical wristwatch comprising a case having a middle, a back cover and a bezel, a device for generating vibrations which are intended to produce at least one sound, which is accommodated in said case, a device for amplifying the vibrations generated by said vibration-generating device, and a membrane arranged to receive said amplified vibrations and generate a sound from the inside to the outside of the wristwatch.

According to the invention, the vibration-generating device is a rotary element having a reading surface comprising at least one groove arranged to generate sounds, and the wristwatch comprises means for rotationally driving the rotary element, means for actuating said means for rotationally driving the rotary element, as well as a transmission member arranged to cooperate with the rotary element to transmit, to the amplification device, the vibrations generated by the groove during rotational movement of said rotary element.

In an advantageous manner, the rotary element can comprise at least one groove with several helical coils extending over its reading surface, the transmission member and the rotary element being arranged to be mobile with respect to each other such that the transmission member moves over at least part of the reading surface of the rotary element when said rotary element performs more than one rotation.

Preferably, the vibration-amplifying device comprises a lever pivotally mounted on a support in a pivoting plane non-parallel to the plane of the membrane and arranged to be actuated by the transmission member to transmit the vibrations to said lever, said lever likewise being integral with the membrane at least translationally in the pivoting plane such that a movement of the transmission member, generated by the vibration of said transmission member linked to the rotary element and transmitted to the membrane by way of the lever actuated by said transmission member, generates an amplified movement of said membrane, so as to generate an amplified sound.

Therefore, the present invention enables the generation of combinations of several sounds, and preferably for a time period of several seconds, preferably at least about ten seconds, and more preferably at least one or even several minutes, enabling a piece of music or words to be reproduced, the sound being amplified to a significant degree with limitation, or even cancellation, of unwanted noise, within the restricted space of a mechanical wristwatch.

According to another aspect, the present invention relates to a mechanical timepiece comprising a case having a middle, a back cover and a bezel, a device for generating vibrations which are intended to produce at least one sound, which is accommodated in said case, a device for amplifying the vibrations generated by said vibration-generating device, and a membrane arranged to receive said amplified vibrations and generate a sound from the inside to the outside of the timepiece.

According to this other aspect of the invention, the vibration-generating device is a rotary element comprising a reading surface comprising at least one groove with several helical coils arranged to generate sounds and extending over said reading surface, and the timepiece comprises means for rotationally driving the rotary element, means for actuating said means for rotationally driving the rotary element, as well as a transmission member arranged to cooperate with the rotary element to transmit, to the amplification device, the vibrations generated by the grooves during rotation of said rotary element, the transmission member and the rotary element being arranged to be mobile with respect to each other such that the transmission member moves over at least part of the reading surface of the rotary element when said rotary element performs more than one rotation.

Advantageously, the vibration-amplifying device comprises means for translationally guiding in a plane in parallel with the plane of the membrane, said means arranged to enable said amplification device to follow the movement of the transmission member over at least part of the reading surface of the rotary element when said rotary element performs more than one rotation, and means for mobile coupling between the amplification device and the membrane, said means arranged to enable said amplification device to remain linked with said membrane as it is moving.

Therefore, the present invention enables the generation of combinations of several sounds for a time period of several seconds to several minutes, enabling a piece of music or words to be reproduced using a mechanical timepiece, the sound being amplified to a significant degree with limitation, or even cancellation, of unwanted noise linked to the vibrations of the parts of the movement.

BRIEF DESCRIPTION OF THE DRAWINGS

Other features and advantages of the present invention will become apparent from reading the following detailed description of various embodiments of the invention provided by way of non-limiting example, the description being made with reference to the appended drawings in which.

DESCRIPTION OF THE PREFERRED EMBODIMENTS

Figure 1:
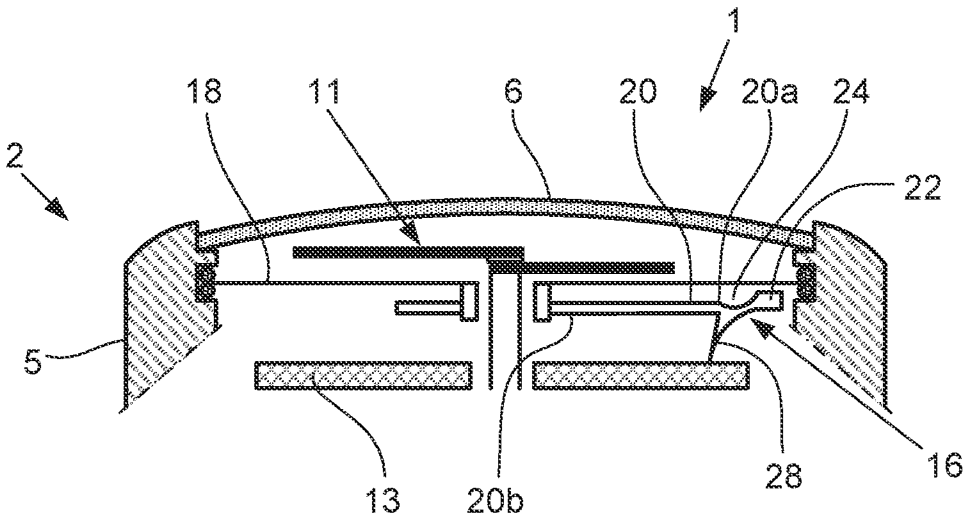
FIG. 1 is a sectional view of the case of a wristwatch or timepiece according to the invention.
Figure 2:
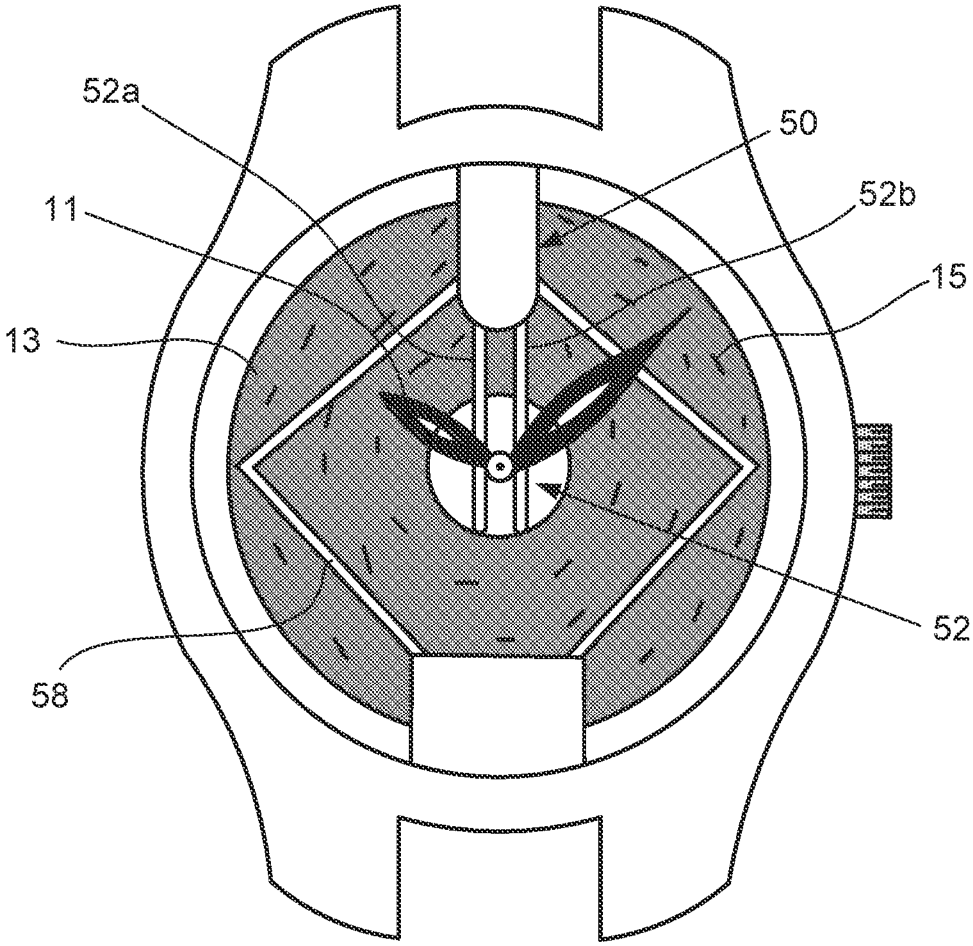
FIG. 2 is a top view of the dial side of a wristwatch according to the invention.
Figure 10:
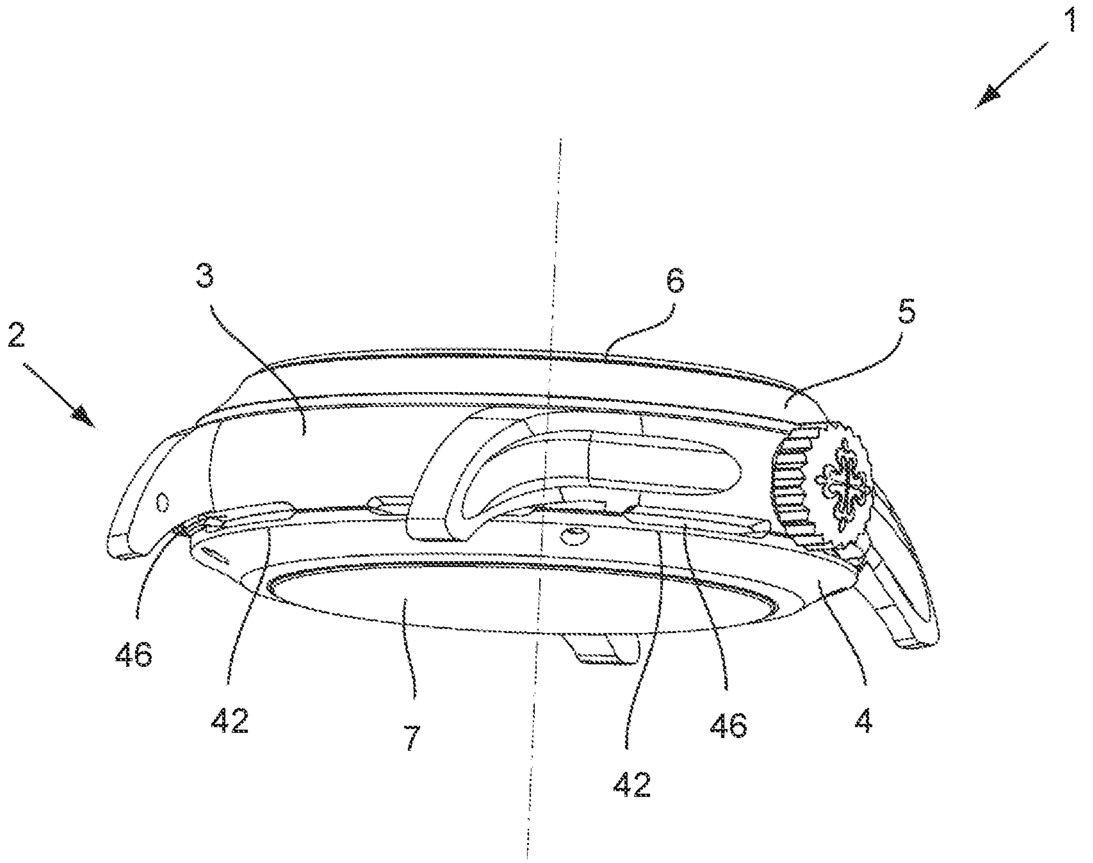
FIG. 10 is a perspective view of the timepiece according to the invention showing the closure of the openings of the compression chamber outside the sound-generating time.

According to a first aspect, the present invention relates to a mechanical wristwatch intended to be worn by a user around his wrist. With reference to FIGS. 1, 2 and 10, said wristwatch 1 comprises a case 2 having a middle 3, a back cover 4 closed by a glass 7, a bezel 5 closed by a glass 6, a device for generating vibrations which are intended to produce at least one sound mechanically, which is accommodated in said case 2, a device 16 for amplifying the vibrations generated by said vibration-generating device, and a membrane 18 arranged to receive said amplified vibrations mechanically and generate a sound from the inside to the outside of the wristwatch 1. The bezel and the middle may be two different parts, or form a single monobloc piece. Similarly, the back cover and the middle may be two different parts, or form a single monobloc piece. The case 2 can also enclose a mechanical timepiece movement allowing the time to be displayed using hands 11 placed between the membrane 18 and the glass 6. The vibration-generating device and the vibration-amplifying device may be independent of the movement, in the form of a module, unless a link to an alarm is required.

According to the invention, the vibration-generating device is a rotary element 13 having a reading surface comprising at least one groove 15 arranged to generate sounds, and the wristwatch comprises means for rotationally driving the rotary element 13, means for actuating said means for rotationally driving the rotary element 13, as well as a transmission member 28 arranged to cooperate with the rotary element 13 to transmit, to the amplification device 16, the vibrations generated by the groove 15 during rotational movement of said rotary element 13.

In the following description, the vibration-generating device, the vibration-amplifying device and the membrane are arranged to generate sounds through the dial side of the wristwatch, and more particularly through the glass 6. Quite obviously, the vibration-generating device, the vibration-amplifying device and the membrane may be arranged similarly but in the reverse manner to generate sounds from the back cover side of the wristwatch, and more particularly through the glass 7.

The rotary element 13 contains acoustic information to be produced in the form of grooves 15. These grooves 15 are etched on the rotary element 13 in a suitable manner to generate any type of sound, for example sounds in the form of words (a speech for example) or music (classical music, electronic music, etc.). The rotation of the rotary element 13 enables the generation of vibrations on the membrane 18 via the transmission member 28 and the vibration-amplifying device 16. According to the first aspect of the invention, the rotary element 13 can comprise one or more grooves each formed of a coil, said coils being concentric in the case of a plurality of grooves, or the rotary element 13 can comprise one or more grooves each formed of several helical coils, the grooves being discontinuous if a plurality of tracks are intended to be formed.

Advantageously, the rotary element 13 is a flat disc mounted in the bezel 5 in parallel with the dial (or with the back cover) of the watch, so as to be rotatable e.g. about the spindle of the hands 11. This flat disc can even be arranged to form a dial for said wristwatch. The disc can be produced from metal (steel, CuBe, etc.). The grooves 15 are etched mechanically (milling cutter, etching needle, etc.) or by laser. The disc can also be produced by galvanic growth (LIGA [lithography, electroplating and moulding]). It can also be made from silicon, produced by DRIE. Ceramic, a composite or a polymer can also be used.

The rotary element 13 can also be formed by a cylinder, placed around the movement, the grooves being arranged on the inner or outer periphery thereof.

The rotary element 13 must have the lowest possible mass and inertia and be balanced in order to obtain rapid acceleration and must not be influenced by accelerations (gravity, impacts, etc.).

Figure 5:
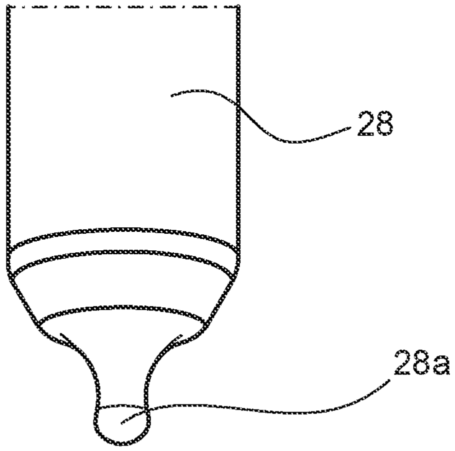
FIG. 5 is a view of a needle used in the present invention.

Preferably, the transmission member 28 is a needle arranged to follow at least one groove 15 of the rotary element 13, said needle being integral with the vibration-amplifying device 16. Such a needle is shown in FIG. 5. It must be thin and hard so as not to wear too quickly. It can be produced by steel, CuBe, ceramic, hard metal, ruby, etc. Its end 28*a* for reading the groove can be spherical as shown or conical.

In order to ensure that the sound can be heard many times, the tribologic torque between the rotary element 13 and the transmission member 28 is high because it is the friction of the transmission member 28 in the grooves 15 which generates the vibration. In the event of wear, the acoustic quality would be directly impacted.

Advantageously, the means for rotationally driving the rotary element 13 comprise a spring, of the barrel spring type. The spring is configured to provide the energy necessary for operation of the rotary element 13 to ensure reading one time or multiple times.

The wristwatch also comprises a winding mechanism for the spring. In the case of one-time reading, the spring can be wound by a slide, of the minute repeater type. For a mechanism arranged for multiple-time reading, the spring can be wound by a winding stem, similarly to the barrel of the movement.

Moreover, the wristwatch comprises a regulator arranged to control the rotational speed of the rotary element 13. This regulator may be of the flywheel type (similar to those used in a minute repeater), of the escapement type with a balance or flexible guiding, of the vane type, or regulated by its own inertia.

The means for actuating the means for rotationally driving the rotary element may be of different types based on the driving means, the reading on one or more rotations, and the function of the generated sounds. Therefore, the means for actuating the means for rotationally driving the rotary element can comprise a slide, of the minute repeater type, enabling winding of the spring as described above as well as the engagement of the rotation of the rotary element 13. If need be, the slide can also be arranged to bring the transmission member to an initial reading position at the beginning of the reading surface, as described in detail hereinafter.

The means for actuating the means for rotationally driving the rotary element can also comprise a push button arranged to bring the transmission member to an initial reading position at the beginning of the reading surface, as described in detail hereinafter, upon actuation of the push button, then to engage the rotation of the rotary element 13 and enable reading, upon release of said push button.

When the generated sound is used as an alarm, the means for actuating the means for rotationally driving the rotary element can comprise an engagement mechanism linked to a predetermined time and cooperating with the watch movement.

Figure 3:
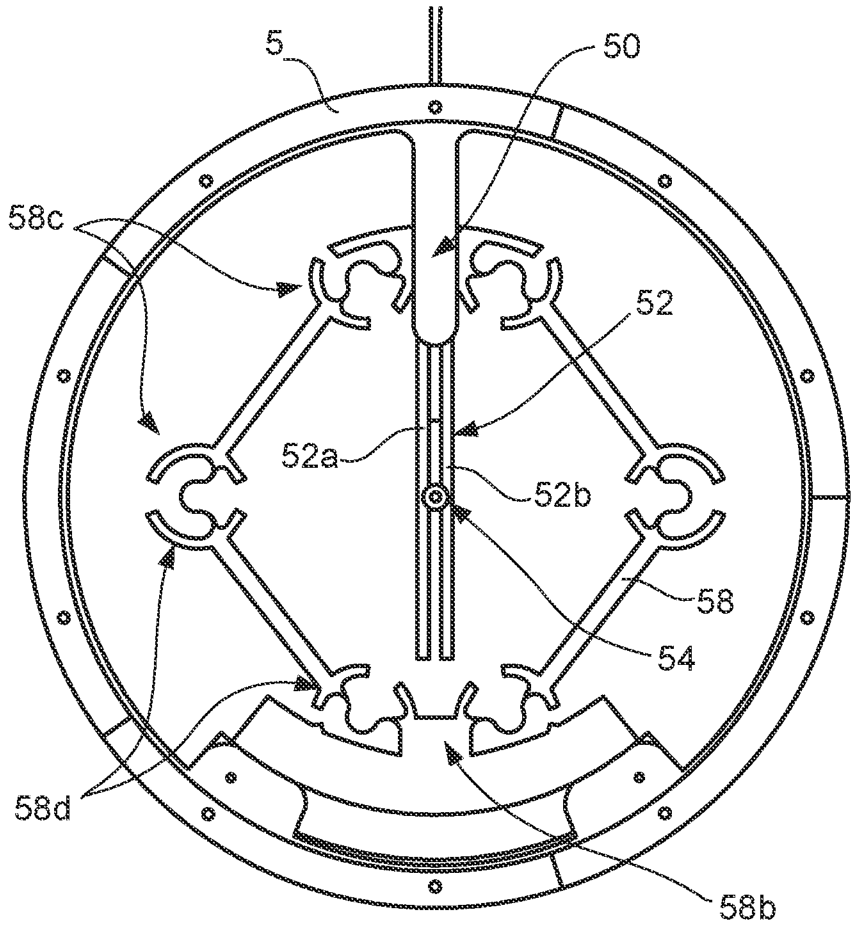
FIG. 3 is a top view of the vibration-amplifying device used in the present invention.
Figure 4:
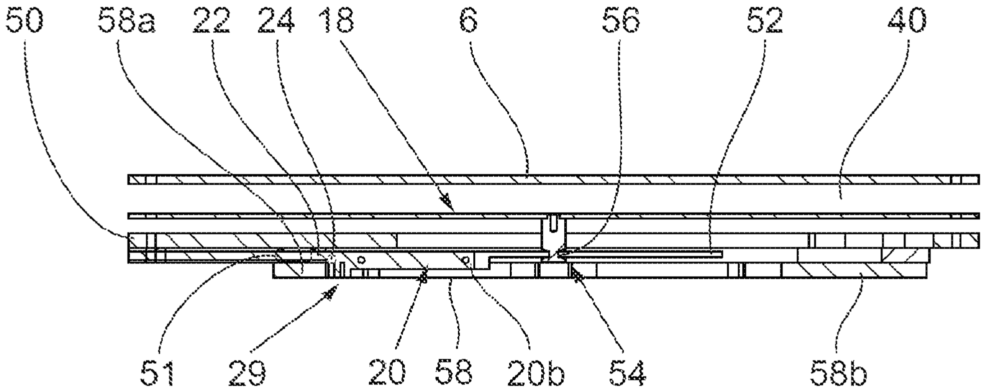
FIG. 4 is a sectional view of the vibration-amplifying device and the membrane.

With reference more particularly to FIGS. 1, 3 and 4, in order to amplify the sounds produced by the rotary element 13, the device 16 for amplifying the vibrations generated by said rotary element 13 comprises a lever 20 linked to a support 22 by an articulation along a single axis of rotation, such that said lever 20 is tiltably or pivotally mounted on said support 22 about said axis of rotation, in a pivoting plane non-parallel to the plane of the membrane 18.

Particularly preferably, the lever 20 is pivotally mounted on its support 22 such that it tilts in a pivoting plane which is perpendicular to the plane defined by the membrane 18.

Particularly preferably, the lever 20 is pivotally mounted on the support 22 by way of a flexible ball joint 24. The flexible ball joint makes it possible to change the direction of the vibrations if necessary. A pin which is mounted transversely on the support 22 and constitutes the pivot axis of the lever 20 could also be used.

The lever 20 is arranged to be actuated by the transmission member 28 cooperating with the rotary element 13 to transmit, to the lever 20, the vibrations generated by the grooves 15. The transmission member 28, in this case the needle, is preferably integral with the lever 20. It is mounted for example by embedding or brazing. To this end, the lever 20 comprises an orifice 29 into which the needle is inserted.

The lever 20 is also integral with the membrane 18 at least translationally in the pivoting plane of the lever 20 in order to be capable of moving said membrane 18 in the pivoting plane of the lever 20 when it tilts. Thus, a movement of the transmission member 28, generated by the vibration of said transmission member 28 linked to the rotary element and transmitted to the membrane 18 by way of the lever 20 actuated by said transmission member 28, generates an amplified movement of said membrane 18, so as to generate an amplified sound. It is the linear movement of the membrane 18 moved by the lever 20 which will generate an amplified sound.

More specifically, the lever 20 comprises a first end 20*a* pivotally mounted on the support 22 in a pivoting plane non-parallel to the plane of the membrane 18 and integral with the transmission member 28 and a second end 20*b* integral with the membrane 18 at least translationally in the pivoting plane of said lever 20, as described hereinafter.

In the case of a rotary element comprising a single groove formed of a single coil, or a set of grooves with concentric coils (in this case, the wristwatch comprises a mechanism for positioning the transmission member, said mechanism being arranged to position the transition member facing the groove to which it is assigned), the transmission member 28 is fixed relative to the rotary element 13 at the time of reading. The lever 20 is thus translationally fixed and is fixedly connected to the membrane 18, i.e. it is integral with the membrane 18 rotationally and translationally. The lever 20 can be fixed to the membrane 18 for example by way of a screw screwed into a hole provided on the membrane 18 and into a hole provided on the lever 20, or by adhesive bonding, welding, etc.

Particularly preferably, the rotary element 13 comprises at least one groove formed of several helical coils extending over its reading surface, enabling reading of the rotary element 13 upon several rotations, which enables the reading time to be increased. In this case, the transmission member 28 and the rotary element 13 are arranged to be mobile with respect to each other such that the transmission member 28 moves over at least part of the reading surface of the rotary element 13 when said rotary element performs more than one rotation. This means that either the transmission member 28 is moved, the rotary element 13 remaining fixed in position, or conversely the transmission member 28 remains fixed in position, the rotary element 13 being moved.

Preferably, in the variant shown, the transmission member 28 is moved, the rotary element 13 remaining fixed in position.

The vibration-amplifying device 16 integral with the transmission member 28 must thus be arranged to be able to follow the movements of said transmission member 28. A mobile connection between the lever 20 and the membrane 18 must thus be provided.

To this end, the vibration-amplifying device 16 comprises means for translationally guiding in a plane in parallel with the plane of the membrane 18, said means being arranged to enable said amplification device 16 to follow the movement of the transmission member 28 over at least part of the reading surface of the rotary element when said rotary element 13 performs more than one rotation, and means for mobile coupling between the amplification device 16 and the membrane 18, said means being arranged to enable said amplification device 16 to remain linked with said membrane 18 as it is moving.

Advantageously, said means for translationally guiding the amplification device comprise a bearing element 50 integral with the case 2 and along which the support 22 of the lever 20 can bear and slide in a plane in parallel with the plane of the membrane 18. A spring 51 can guarantee good bearing of the support 22 on the bearing element 50. The bearing element 50 can be mounted on the bezel 5 if the sound is generated on the dial side or on the back cover 4 if the sound is generated on the back cover side, or even on the middle. It is made of a rigid material. It has a length sufficient to enable guiding of the support 22 throughout its movement.

The mobile coupling means comprise a fork 52 integral with the second end 20*b* of the lever and a stud 54 integral with the membrane 18 and having a groove 56 accommodating the two prongs 52*a*, 52*b* of the fork. Therefore, since said fork 52 is engaged with the stud 54, more specifically in contact with the lateral faces of the stud 54 in its groove 56, it can slide on either side of said stud 54 in a plane in parallel with the plane of the membrane 18, whilst being integral with the stud 54 translationally in the pivoting plane, bearing on the stud 54. Thus, a movement of the needle, generated by the vibration of the needle linked to the rotary element 13 and transmitted to the membrane 18 by way of the lever 20 actuated by said needle, generates an amplified movement of said membrane 18, so as to generate an amplified sound.

Advantageously, the vibration-amplifying device 16 comprises articulated stabilising arms 58 which are integral with the lever 20. These arms 58 can be in the form of a pantograph, a tip 58*a* of the pantograph being integral with the support 22 of the lever 20 and the opposite tip 58*b* being integral with the case 2 (bezel, back cover or middle) or with the movement of the wristwatch. The articulations can advantageously be in the form of flexible ball joints 58*c*. Stops 58*d* can be provided to limit the movement of the pantograph.

When reading of the rotary element 13 is effected over several rotations, the wristwatch comprises a mechanism for bringing the transmission member 28 to an initial position corresponding to the beginning of the reading surface of the rotary element 13, prior to or simultaneously with the actuation of the means for actuating the means for rotationally driving said rotary element 13. Said mechanism cooperates for example with the slide or push button described above.

The point of actuation of the lever 20 by the transmission member 28, the pivoting point of the lever 20 and the point where the lever 20 is linked to the membrane 18 are positioned such that a movement of the transmission member 28, generated by the vibration of said transmission member 28 linked to the rotary element 13 and transmitted to the membrane 18 by way of the lever 20 actuated by said transmission member 28, generates an amplified movement of said membrane 18 by a mechanical lever arm effect, thereby generating an amplified sound.

Preferably, the flexible ball joint 24 is positioned on the centre of mass of the transmission member/lever/membrane assembly.

Preferably, the point where the lever 20 is linked to the membrane 18 is located at a distance from the centre of said membrane 18 which is less than 40%, preferably less than 20%, of the width of said membrane 18. Particularly preferably, the point where the lever 20 is linked to the membrane 18 is located at the centre of said membrane 18, in order to maximise the lever arm effect.

In another variant, the link point can be positioned at the periphery of the membrane, playing on the elasticity of the fixing point and torsion of the membrane.

In the case where the transmission member 28 and the lever 20 are moved, the rotary element 13 remaining fixed in position, the reduction in the amplification of the sound owing to the reduction in the lever arm effect is compensated for by having increased the amplitude of the vibration generated by the groove read by the transmission member 28.

So as not to damage the rotary element 13 and/or the transmission member 28, a system of protection in case of impacts is provided.

Advantageously, the vibration-amplifying device, and more particularly the support 22 of the lever 20, is isolated from the movement and from the frame. To this end, the support 22 of the lever 20 may be mounted on an external part and more particularly on the bezel 5 if the sound is transmitted from the dial side, or on the back cover 4, if the sound is transmitted through the back cover.

The support 22 of the lever 20 may also be mounted on the movement, or even on the middle 3, but by way of an isolating element, such as a polymer, in order to ensure the isolation of the support 22 from the movement, the middle and the frame.

When the support 22 of the lever 20 is mounted on one of the elements of the case (bezel 5, middle 3, back cover 4), it is likewise possible to isolate the movement from the remainder of the watch by disposing an isolating device on the movement, between the movement and said element of the case which bears the support 22 of the lever 20. Such an isolating device may be for example a brass ring associated with a flat gasket or an isolating ring of carbon-filled polyether ether ketone (PEEK). For example, in order to isolate the movement, the latter may be flanged onto a PEEK isolating ring which is itself screwed into the case middle.

When the support 22 of the lever 20 is mounted on the bezel 5, or on the back cover 4, said bezel 5, or said back cover 4, may be conventionally mounted directly on the middle 3. However, in order to ensure that little or no unwanted vibration arrives at the middle 3 and therefore at the movement, said bezel 5, or said back cover 4, is mounted on the middle 3 by way of an isolating element, such as a polymer.

The membrane 18 is mounted on the back cover 4, if the sound is transmitted through the back cover, or the bezel 5 if the sound is transmitted from the dial side. Thus, the membrane 18 is also isolated from the movement.

Consequently, the vibration-amplifying device and the membrane are isolated from the movement and the frame such that all the vibrations of the rotary element 13 recovered by the lever 20 are directed and transmitted to the membrane 18, without transmission to the movement, the frame or the middle.

The lever 20 is preferably made from a very light and very rigid material. For example, the lever 20 may be made of steel, titanium, aluminium, magnesium, composite material, carbon, glass, sapphire and ceramic.

The membrane 18 must be able to vibrate freely. It is preferably made from a very light and rigid material in order have a large dynamic response and not to deform when it moves. The membrane 18 is preferably made of a transparent material. For example, the membrane 18 may be made in the form of a plate of sapphire, mineral glass, Plexiglas, etc. The membrane 18 may thus be constituted by an internal glass disposed under the glass 6 (or the glass 7, as applicable). The membrane 18 may also be made of composite materials, cellulose, or composite glass of the safety glass type. Quite obviously, the membrane 18 may also be made of a material which is not totally transparent, such as translucent or opaque materials, such as metallic glass, titanium, silicon, ceramic, carbon fibre composite, cellulose or Kevlar.

The membrane 18 must be as rigid and as light as possible. To this end, its thickness is less than 1 mm, preferably less than 0.5 mm and more preferably less than 0.3 mm.

Figure 6:
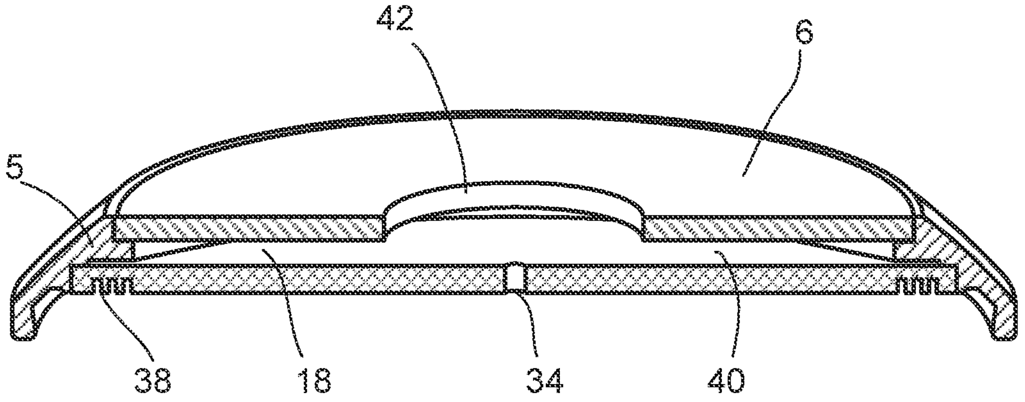
FIG. 6 is a sectional view of the membrane and the compression chamber.

Referring more specifically to FIG. 6, the membrane 18 is preferably mounted on a suspension to allow it to vibrate freely while ensuring sealing tightness. The suspension may be provided by way of a moulded gasket disposed around the membrane 18 or an O-ring gasket disposed on the periphery on either side of the membrane 18, between said membrane 18 and the bezel 5 (or the back cover 4, as applicable). It is likewise possible to texture the membrane 18 to improve its flexibility, for example by way of grooves 38 provided on the periphery of the membrane 18. It is also possible to play on the thickness of the membrane 18.

Advantageously, the wristwatch further comprises a compression chamber 40 which is arranged to amplify the sound which has been generated by the movement of the membrane, which has already been amplified a first time, before it emerges to the outside.

The compression chamber 40 is closed by a wall disposed downstream of the membrane 18 and having at least one opening 42 directed towards the outside of the timepiece. The dimensions of the opening 42 are selected in relation to the surface area of the membrane 18 as a function of the desired sound amplification.

Preferably, when the membrane 18 is disposed on the bezel (or back cover 4), said wall is constituted by the glass 6 (or glass 7). Said glass 6 or 7 must be strong and scratchproof. It is preferably made of sapphire.

The wall disposed downstream of the membrane 18 makes it possible to generate a certain volume of air in the compression chamber 40. Movement of the membrane 18 compresses this air. The ratio between the surface area of the moving membrane 18 which defines the volume of air and the size of the openings will make it possible to achieve a second amplification of the sound.

The opening 42 may take various forms: a hole in the centre of the wall, in this case the glass 6, a plurality of lateral holes, a multitude of micro-holes, etc. The shape of the outlet opening may be conical to amplify the sound further. Advantageously, the opening 42 may take the form of one or more longitudinal grooves extending around the middle, parallel to the plane of the movement, and obtained by leaving a space for example between the back cover 4 and the middle 3 if the membrane 18 is disposed on the back cover 4, as shown in FIG. 10. Such lateral openings 42 advantageously make it possible to redirect the sound generated by the membrane 18 onto the wristwatch wearer's arm, giving said wearer the sensation of even further amplified sound.

Figure 7:
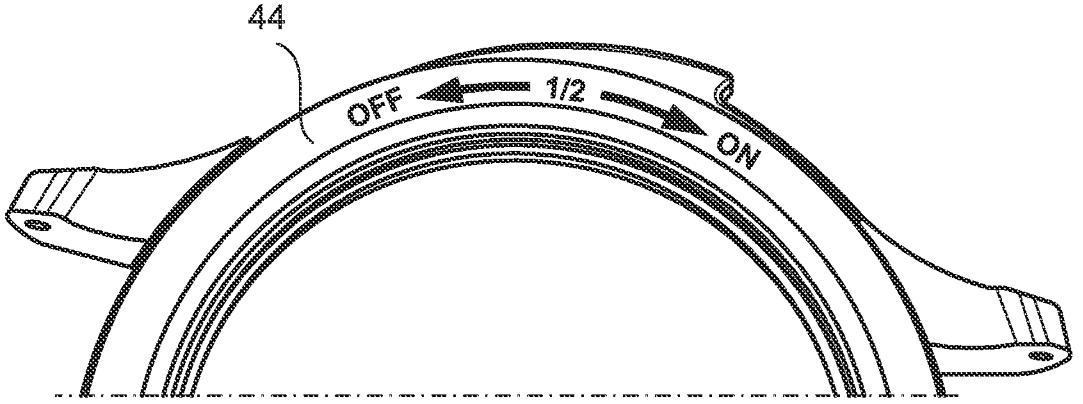
FIG. 7 is a view of the means for adjusting the volume of the sound generated by the membrane.
Figure 8:
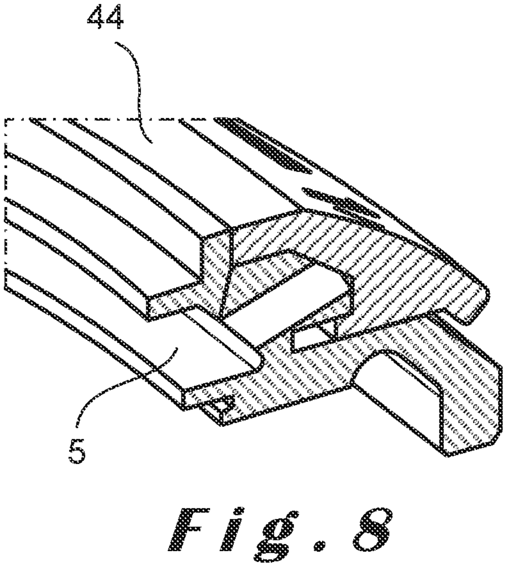
FIGS. 8 and 9 are partial, sectional views respectively showing the volume-adjusting means in the closed position and the open position.
Figure 9:
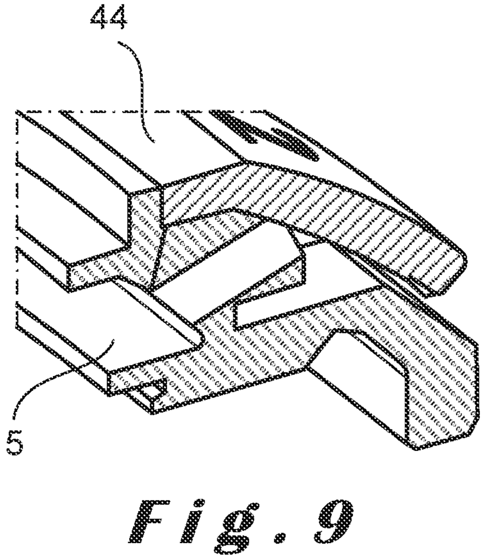

With reference to FIGS. 7 to 9, the wristwatch advantageously comprises adjustable closure means 44 of the opening 42 of the compression chamber 40 which are arranged to make it possible to adjust the volume of sound generated by the membrane 18. These closure means 44 are arranged to be movable between a closed position in which the opening 42 is entirely closed and an open position in which the opening 42 is at its largest, the intermediate positions allowing the opening 42 to be blocked to a greater or lesser extent in order to adjust the sound volume. For example, when the opening 42 is a lateral opening, the closure means 44 may comprise a rotary element such as a ring, mounted rotatably on the bezel 5 (or back cover 4 if applicable), and arranged to rotate between a closed position in which the opening 42 is entirely blocked, as shown in FIG. 8, and an open position in which the opening 42 is at its largest, as shown in FIG. 9.

Advantageously, the opening 42 may be protected by an air-permeable and water-proof filter, in order to prevent impurities from entering the compression chamber 40. Such filters are known to a person skilled in the art.

Advantageously, and with reference to FIG. 10, in which the devices and the membrane are arranged on the back cover side, the sound being generated on the back cover side, the wristwatch may comprise a mechanism for closing the opening 42 of the compression chamber 40 arranged to close said opening 42 once the sound has been generated, for example outside the striking time. Such a mechanism makes it possible to limit the ingress of impurities when the vibration-generating device is not in use. In particular, when the opening 42 is a lateral opening, the closing mechanism may comprise a closing member 46, such as a ring, controlled by the striking-mechanism so as to close the opening 42 automatically once striking is complete. Such a mechanism is described, for example, in patent CH 704 940, which is incorporated by reference.

When the membrane 18 is disposed on the back cover 4 and sound is generated from the back cover side, it is also possible to provide a reflector, arranged to allow the generated sound to rise up the side of the watch. Such a reflector is for example positioned on the outside of the back cover, and has conical outer walls surrounding the back cover and directed towards the watch.

The wristwatch according to the invention enables the generation, using the rotary element comprising etched grooves, of combinations of several sounds, and preferably for a time period of several seconds to several minutes, enabling a piece of music or words to be reproduced, within the restricted space of a mechanical wristwatch.

Furthermore, the wristwatch according to the invention enables significant sound amplification: the ratio of the first amplification performed by way of the lever 20 is of the order of 10 to 16. Furthermore, due to the ratio between the moving surface area of the membrane 18 and the opening 42 (surface area ratio of 20 to 30), the second amplification ratio is of the order of 1.5. The total amplification ratio achieved by the watch according to the invention is such that a sound greater than 80 dB, or even 90 dB, may be obtained, as compared to a standard minute-repeater sound of 60 dB.

Furthermore, the construction and mounting of the amplification device make it possible to isolate the rotary element and the membrane from the movement, the frame and the middle, such that all the vibrations are directed onto the membrane by way of the lever without passing via the movement. Little, or even no, unwanted sound generally associated with the vibrations of movement components is thus produced.

Moreover, since the amplification device with the membrane is integral with the back cover or the bezel, the movement can be easily accessed simply once the back cover or the bezel is just removed.

Finally, the construction of the amplification device with the membrane is such that the sealing tightness of the case has no impact on sound volume, unlike all other minute-repeater principles, for example. This is because the membrane with its suspension makes the system leaktight with the exception of the compression chamber 40. The latter may be made leaktight by a filter system.

According to another aspect, the present invention relates more generally to a mechanical timepiece 1 comprising a case 2 having a middle 3, a back cover 4 and a bezel 5, a device for generating vibrations which are intended to produce at least one sound mechanically, which is accommodated in said case 2, a device 16 for mechanically amplifying the vibrations generated by said vibration-generating device, and a membrane 18 arranged to receive said mechanically amplified vibrations and generate a sound from the inside to the outside of the timepiece, the vibration-generating device being a rotary element 13 having a reading surface comprising at least one groove 15 formed of several helical coils, said groove being arranged to generate sounds and extending over said reading surface. Said timepiece comprises means for rotationally driving the rotary element 13, means for actuating said means for rotationally driving the rotary element 13, and a transmission member 28 arranged to cooperate with the rotary element 13 to transmit, to the amplification device 16, the vibrations generated by the grooves 15 during rotation of said rotary element 13, the transmission member 28 and the rotary element 13 being arranged to be mobile with respect to each other such that the transmission member 28 moves over at least part of the reading surface of the rotary element 13 when said rotary element 13 performs more than one rotation.

Advantageously, the vibration-amplifying device 16 comprises means for translationally guiding in a plane in parallel with the plane of the membrane 18, said means being arranged to enable said amplification device 16 to follow the movement of the transmission member 28 over at least part of the reading surface of the rotary element 13 when said rotary element 13 performs more than one rotation, and means for mobile coupling between the amplification device 16 and the membrane 18, said means being arranged to enable said amplification device 16 to remain linked with said membrane 18 as it is moving.

Advantageously, the vibration-amplifying device 16 comprises a lever 20 having a first end 20*a* pivotally mounted on a support 22 in a pivoting plane non-parallel to the plane of the membrane 18 and integral with the transmission member 28 so as to be able to be actuated by said transmission member 28 for transmitting, to the lever 20, the vibrations generated by the rotary element 13, said means for translationally guiding the amplification device comprise a bearing element 50 integral with the case 2 and along which the support 22 of the lever 20 can bear and slide in a plane in parallel with the plane of the membrane 18. The mobile coupling means comprise a fork 52 integral with the second end 20*b* of the lever 20 and a stud 54 integral with the membrane 18, said fork 52 being engaged with the stud 54 in order to slide on either side of said stud 54 in a plane in parallel with the plane of the membrane 18, whilst being integral with the stud 54 translationally in the pivoting plane. Thus, a movement of the needle, generated by the vibration of the needle linked to the rotary element 13 and transmitted to the membrane 18 by way of the lever 20 actuated by said needle, generates an amplified movement of said membrane 18, so as to generate an amplified sound.

Advantageously, the vibration-amplifying device 16 comprises articulated stabilising arms 58 which are integral with the lever 20.

The timepiece further comprises a mechanism for bringing the transmission member 28 to an initial position corresponding to the beginning of the reading surface of the rotary element 13, prior to or simultaneously with the actuation of the means for actuating the means for rotationally driving the rotary element 13.

The transmission member is advantageously a needle arranged to follow the grooves 15 of the rotary element 13, said needle being integral with the vibration-amplifying device 16.

Preferably, the rotary element 13 is a flat disc or a cylinder. It can be a flat disc arranged to form a dial for said timepiece.

Advantageously, the grooves 15 provided on the rotary element are arranged to generate sounds in the form of words or music.

Advantageously, the timepiece comprises a compression chamber 40 arranged to amplify the sound which has been generated by the movement of the membrane 18 before it emerges to the outside. Said compression chamber 40 can be closed by a wall disposed downstream of the membrane 18 and having at least one opening 42, the dimensions of which are selected in relation to the surface area of the membrane 18 as a function of the desired sound amplification.

The construction details and the advantages of the wristwatch according to the first aspect of the invention, in particular the details relating to the vibration-amplifying device, the means for translationally guiding and the mobile coupling means, similarly apply to the timepiece according to the second aspect of the invention.

The invention claimed is:

1. A mechanical wristwatch comprising a case having a middle, a back cover and a bezel, a vibration-generating device for generating vibrations which are intended to produce at least one sound, which is accommodated in said case, a vibration-amplifying device for amplifying the vibrations generated by said vibration-generating device, and a membrane arranged to receive said amplified vibrations and generate a sound from the inside to the outside of the wristwatch, wherein the vibration-generating device is a rotary element having a reading surface comprising at least one groove extending over the reading surface of the rotary element, said at least one groove being arranged to generate sounds, and wherein the wristwatch comprises means for rotationally driving the rotary element, means for actuating said means for rotationally driving the rotary element, and a transmission member arranged to cooperate with the rotary element to transmit, to the vibration-amplifying device, the vibrations generated by the groove during rotational movement of said rotary element, wherein the transmission member and the rotary element are arranged to be mobile with respect to each other such that the transmission member moves over at least part of the reading surface of the rotary element when said rotary element performs more than one rotation, and wherein the vibration-amplifying device comprises a lever pivotally mounted on a support in a pivoting plane non-parallel to the plane of the membrane and arranged to be actuated by the transmission member to transmit the vibrations to said lever, said lever likewise being integral with the membrane at least translationally in the pivoting plane such that a movement of the transmission member, generated by the vibration of said transmission member linked to the rotary element and transmitted to the membrane by way of the lever actuated by said transmission member, generates an amplified movement of said membrane by a mechanical lever arm effect, so as to generate an amplified sound.

2. The wristwatch according to claim 1, wherein the means for rotationally driving the rotary element comprise a spring and a winding mechanism for said spring.

3. The wristwatch according to claim 1, further comprising a regulator arranged to control the rotational speed of the rotary element.

4. The wristwatch according to claim 1, wherein the means for actuating the means for rotationally driving the rotary element comprise a slide, a push button or an engagement mechanism linked to a predetermined time and cooperating with a watch movement.

5. The wristwatch according to claim 1, further comprising a compression chamber which is arranged to amplify the sound which has been generated by movement of the membrane before the sound emerges to the outside.

6. The wristwatch according to claim 5, wherein the compression chamber is closed by a wall disposed downstream of the membrane and having at least one opening, the dimensions of which are selected in relation to the surface area of the membrane as a function of the desired sound amplification.

7. The wristwatch according to claim 6, wherein the lever has a first end pivotally mounted on the support in a pivoting plane non-parallel to the plane of the membrane and integral with the transmission member, wherein said means for translationally guiding the vibration amplifying device comprise a bearing element integral with the case and along which the support of the lever can bear and slide in a plane in parallel with the plane of the membrane, and wherein the mobile coupling means comprise a fork integral with a second end of the lever and a stud integral with the membrane, said fork being engaged with the stud in order to slide on either side of said stud in a plane in parallel with the plane of the membrane, whilst being integral with the stud translationally in the pivoting plane.

8. The wristwatch according to claim 7, wherein the vibration-amplifying device comprises articulated stabilising arms which are integral with the lever.

9. The wristwatch according to claim 1, wherein the vibration-amplifying device comprises means for translationally guiding in a plane in parallel with the plane of the membrane, said means being arranged to enable said vibration-amplifying device to follow the movement of the transmission member over at least part of the reading surface of the rotary element when said rotary element performs more than one rotation, and means for mobile coupling between the vibration-amplifying device and the membrane, said means being arranged to enable said vibration-amplifying device to remain linked with said membrane as the membrane is moving.

10. The wristwatch according to claim 1, further comprising a mechanism for bringing the transmission member to an initial position corresponding to a beginning of the reading surface of the rotary element, prior to or simultaneously with an actuation of the means for actuating the means for rotationally driving the rotary element.

11. The wristwatch according to claim 1, wherein the transmission member is a needle arranged to follow the at least one groove of the rotary element, said needle being integral with the vibration-amplifying device.

12. The wristwatch according to claim 1, wherein the rotary element is a flat disc or a cylinder.

13. The wristwatch according to claim 12, wherein the rotary element is a flat disc.

14. The wristwatch according to claim 1, wherein the groove provided on the rotary element is arranged to generate sounds in the form of words or music.

15. A mechanical timepiece comprising a case having a middle, a back cover and a bezel, a vibration-generating device for generating vibrations which are intended to produce at least one sound, which is accommodated in said case, a vibration-amplifying device for amplifying the vibrations generated by said vibration-generating device, and a membrane arranged to receive said amplified vibrations and generate a sound from the inside to the outside of the timepiece, wherein the vibration-generating device is a rotary element having a reading surface comprising at least one groove arranged to generate sounds and extending over said reading surface, and wherein the timepiece comprises means for rotationally driving the rotary element, means for actuating said means for rotationally driving the rotary element, and a transmission member arranged to cooperate with the rotary element to transmit, to the vibration-amplifying device, the vibrations generated by the grooves during rotation of said rotary element, the transmission member and the rotary element being arranged to be mobile with respect to each other such that the transmission member moves over at least part of the reading surface of the rotary element when said rotary element performs more than one rotation, and wherein the vibration-amplifying device comprises a lever pivotally mounted on a support in a pivoting plane non-parallel to the plane of the membrane and arranged to be actuated by the transmission member to transmit the vibrations to said lever, said lever likewise being integral with the membrane at least translationally in the pivoting plane such that a movement of the transmission member, generated by the vibration of said transmission member linked to the rotary element and transmitted to the membrane by way of the lever actuated by said transmission member, generates an amplified movement of said membrane by a mechanical lever arm effect, so as to generate an amplified sound.

16. The timepiece according to claim 15, wherein the vibration-amplifying device comprises means for translationally guiding in a plane in parallel with the plane of the membrane, said means being arranged to enable said support of the lever to follow the movement of the transmission member over at least part of the reading surface of the rotary element when said rotary element performs more than one rotation, and means for mobile coupling between the lever and the membrane, said means being arranged to enable said lever to remain linked with said membrane as the membrane is moving.

17. The timepiece according to claim 16, wherein the vibration-amplifying device comprises a lever having a first end pivotally mounted on a support in a pivoting plane non-parallel to the plane of the membrane and integral with the transmission member, wherein said means for translationally guiding the vibration amplifying device comprise a bearing element integral with the case and along which the support of the lever can bear and slide in a plane in parallel with the plane of the membrane, and wherein the mobile coupling means comprise a fork integral with the second end of the lever and a stud integral with the membrane, said fork being engaged with the stud in order to slide on either side of said stud in a plane in parallel with the plane of the membrane, whilst being integral with the stud translationally in the pivoting plane.

18. The timepiece according to claim 17, wherein the vibration-amplifying device comprises articulated stabilising arms which are integral with the lever.

19. The timepiece according to claim 15, further comprising a mechanism for bringing the transmission member to an initial position corresponding to a beginning of the reading surface of the rotary element, prior to or simultaneously with an actuation of the means for actuating the means for rotationally driving the rotary element.

20. The timepiece according to claim 15, wherein the transmission member is a needle arranged to follow the grooves of the rotary element, said needle being integral with the vibration amplifying device.

21. The timepiece according to claim 15, wherein the rotary element is a cylinder.

22. The timepiece according to claim 15, wherein the grooves provided on the rotary element are arranged to generate sounds in the form of words or music.

23. The timepiece according to claim 15, further comprising a compression chamber which is arranged to amplify the sound which has been generated by the movement of the membrane before the sound emerges to the outside.

24. The timepiece according to claim 23, wherein the compression chamber is closed by a wall disposed downstream of the membrane and having at least one opening, the dimensions of which are selected in relation to the surface area of the membrane as a function of the desired sound amplification.

* * * * *